United States Patent
Kim et al.

(10) Patent No.: US 7,162,490 B2
(45) Date of Patent: Jan. 9, 2007

(54) METHOD FOR PROCESSING DYNAMIC DATABASE IN DISTRIBUTED PROCESSING SYSTEM BASED ON CORBA PLATFORM

(75) Inventors: Sang Wook Kim, Kyungki-Do (KR); Young Wook Jun, Seoul (KR)

(73) Assignee: LG-Nortel Co., Ltd., Seoul (KR)

( * ) Notice: Subject to any disclaimer, the term of this patent is extended or adjusted under 35 U.S.C. 154(b) by 1047 days.

(21) Appl. No.: 10/026,538

(22) Filed: Dec. 27, 2001

(65) Prior Publication Data
US 2002/0129030 A1 Sep. 12, 2002

(30) Foreign Application Priority Data
Dec. 28, 2000 (KR) ............................. 2000-84627

(51) Int. Cl.
*G06F 17/00* (2006.01)
*G06F 13/00* (2006.01)
*G06F 17/30* (2006.01)

(52) U.S. Cl. .................... 707/103 R; 707/10; 719/330
(58) Field of Classification Search .................... None
See application file for complete search history.

(56) References Cited

U.S. PATENT DOCUMENTS

| | | | | |
|---|---|---|---|---|
| 5,265,250 A | * | 11/1993 | Andrade et al. | 718/101 |
| 5,280,617 A | * | 1/1994 | Brender et al. | 717/159 |
| 5,787,437 A | * | 7/1998 | Potterveld et al. | 707/103 R |
| 6,493,704 B1 | * | 12/2002 | Hichwa et al. | 707/3 |
| 6,591,272 B1 | * | 7/2003 | Williams | 707/102 |
| 6,654,029 B1 | * | 11/2003 | Chiu et al. | 715/717 |
| 2002/0184401 A1 | * | 12/2002 | Kadel et al. | 709/315 |

OTHER PUBLICATIONS

OMG, Inc.; A Discussion of the Object Management Architecture, Jan. 1997.*

* cited by examiner

*Primary Examiner*—Antony Nguyen-Ba
(74) *Attorney, Agent, or Firm*—Fleshner & Kim, LLP (57) ABSTRACT

A method of processing a dynamic database in a distributed processing system based on CORBA platform includes calling a generic method in a server, detecting data by the called generic method, storing the detected data, and returning the detected data to a client, in the distributed processing system. The detected data is initially stored in a local memory of the database. The generic method then creates a dynamic storage area in the database for the data based on the number of data units that were detected, and based on the size of the detected data unit. In this manner, there is no need to pre-define the structure of the storage area before performing the query.

20 Claims, 6 Drawing Sheets

EXAMPLE IDL FOR METHOD A DEFINED PREVIOUS PICTURE

```
struct struct A
{
  string strA;
  short intA1;
  data data2;
  short intA3;
};
typedef sequence<structA> returndataA
short methodA(in string SQLstring, out returndataA RetVal);
```

EXAMPLE IDL FOR METHOD B DEFINED PREVIOUS PICTURE

```
struct struct A
{ short intB;
  string intB1;
  string intB2;
};
typedef sequence<structB> returndataB
short methodB(in string SQLstring, out returndataB RetVal);
```

EXAMPLE IDL FOR METHOD C DEFINED PREVIOUS PICTURE

```
struct struct A
{ short intC;
  short intC1;
  string strC2;
};
typedef sequence<structC> returndataC
short methodC(in string SQLstring, out returndataC RetVal);
```

| EXAMPLE IDL FOR METHOD A DEFINED PREVIOUS PICTURE |
|---|
| struct elementValue<br>{<br>  short type;  /1:integer 2:float 3:string 4:decimal 5:date/<br>  any value;  /any type for real value/<br>};<br>typedef sequence<elementValue> ElemSeq;  /struct of A/<br>typedef sequence<ElemSeq> ReturnSeq;  /struct of B/<br>short genericMethod(in string SQLstring, out Returnseq RetVal); |

FIG. 6

METHOD FOR PROCESSING DYNAMIC DATABASE IN DISTRIBUTED PROCESSING SYSTEM BASED ON CORBA PLATFORM

BACKGROUND OF THE INVENTION

1. Field of the Invention

The present invention relates to a method for processing a database in a distributed processing system and, more particularly, to a method for processing a dynamic data base in a distributed processing system, based on a Common Object Request Broker Architecture (CORBA) platform.

2. Background of the Related Art

An Object Request Broker (ORB) is a virtual system for communicating between objects in a distributed object environment, and CORBA is a standard specification of the ORB. ORB is arranged by an Object Management Group (OMG) to standardize the object oriented technique.

Generally, a client that requests a service and an object implementation, providing the service, give and take a request or a service result (returned value) through the ORB, in the distributed object environment, and then the process is progressed. To begin with, the client passes a name and request content of the object, which is to be served, to the ORB. Then, the ORB finds the object implementation, based on the name, and transmits the requested contents. The object implementation returns a result of the service performance (return value) to the ORB, and the ORB transmits the result to the client. The client should be compatible with the interface of the ORB, to use a service of the optional object implementation. In addition, an Interface Definition Language (IDL) is used for defining the interface.

A platform is characterized as the hardware or software that forms the basis of a computer system. That is, an Operation System (OS) or an application is operated in a hardware or software environment.

Figure 1:
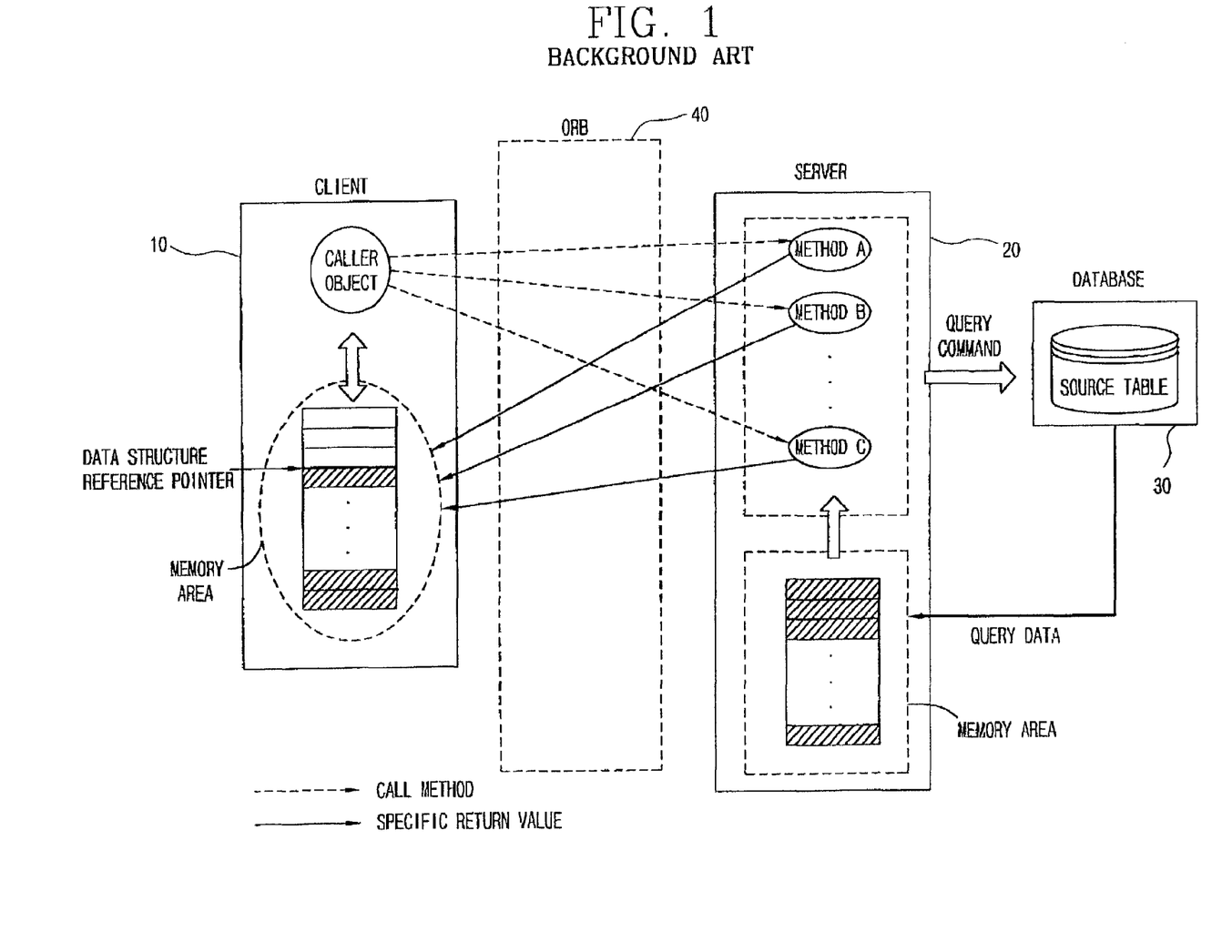
FIG. 1 illustrates database processing in the background art distributed processing system, based on a CORBA platform.

FIG. 1 illustrates database processing in a background art distributed processing system, based on the CORBA platform. A process is shown in which a client 10 accesses a database 30, of a server 20, and obtains data through a distributed system, based on the CORBA platform. Although it is not shown in FIG. 1, the server 20 consists of a plurality of objects, and there is an object that processes the database in the plurality of objects. The object processing the database includes a plurality of methods.

As shown in FIG. 1, when the client 10 calls the method on the server 20, the corresponding method detects the data, wanted by the client 10, in the database 30. The server 20 then returns the data to the client 10 through an Internet Inter-ORB Protocol (IIOP) 40. According to the method, various methods are required because there are various requests by the client 10 for the data.

There are two parameters that are required when the client 10 calls the method. These are a Structure Query Language (SQL) string, for detecting data of the database 30, and a pointer of a data structure, for allocating the detected data. A transmission and a return of the parameters are made by a "call by reference" method. The SQL string is a query for the data that is wanted, and the data structure defines a structure and a formation of a storing space for storing the detected data.

The call by reference method is a method not for giving and taking a real value or data, but for giving and taking a pointer of a memory area, in which a real value or data is stored. And the above-mentioned pointer may be referred to as a reference pointer.

Figure 2:
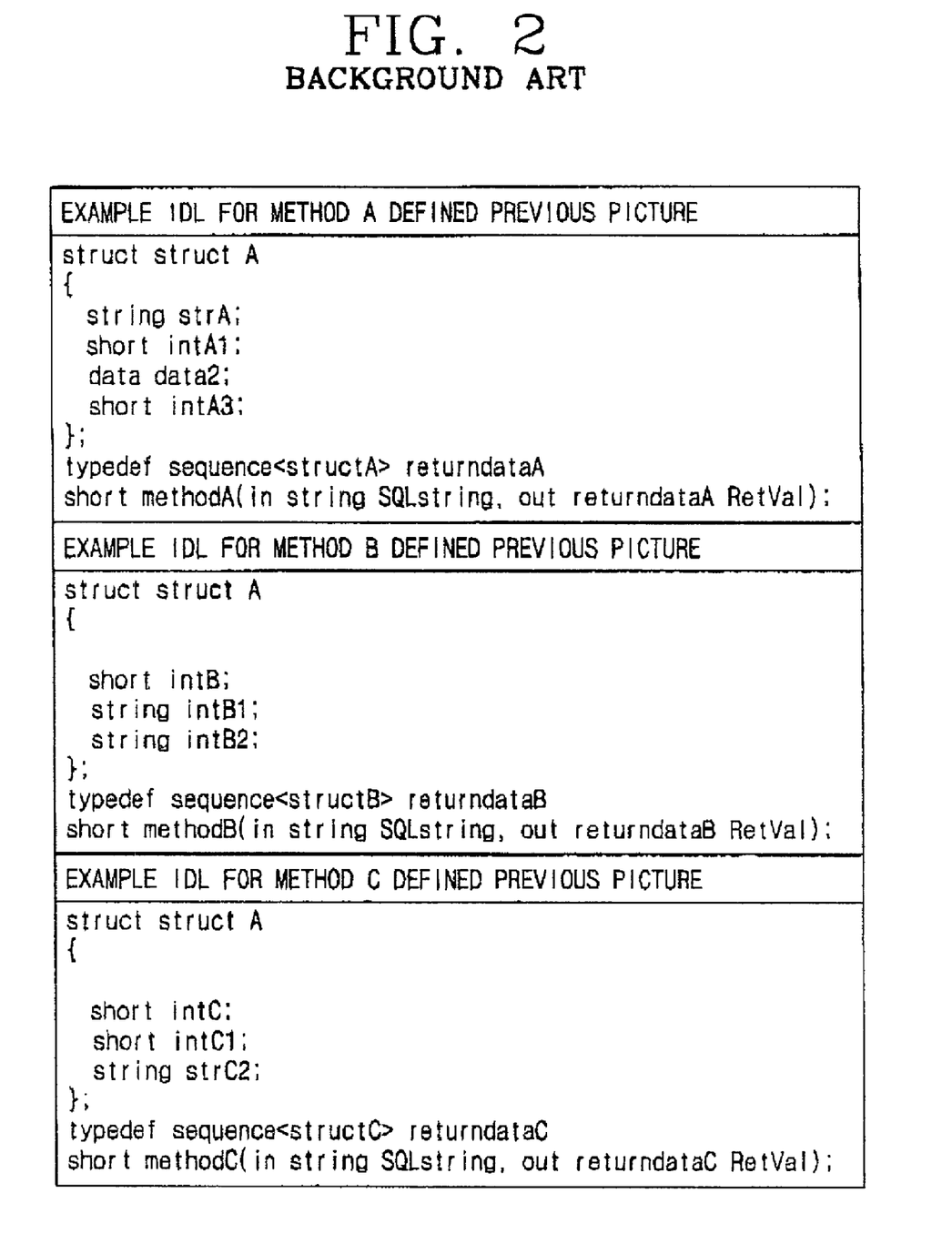
FIG. 2 illustrates an Interface Definition Language (IDL) for several methods.

FIG. 2 is an exemplary view showing an IDL for the call by reference method. Generally, the client 10 finds a reference pointer of the database process object in the CORBA platform server 20. Then, the client 10 calls a method of the server 20 through the reference pointer. The called method detects the wanted data in the database 30 and then constructs the detected data into the data structure form, defined by the IDL, to transmit it to the client 10. In addition, the data structure is defined in the respective method.

If the method called by the client 10 does not exist or does not satisfy the client's request, the server 20 defines a new method. Thereafter, the server 20 should compile the IDL that is coded after adding the newly defined method to the previously defined methods.

Figure 3:
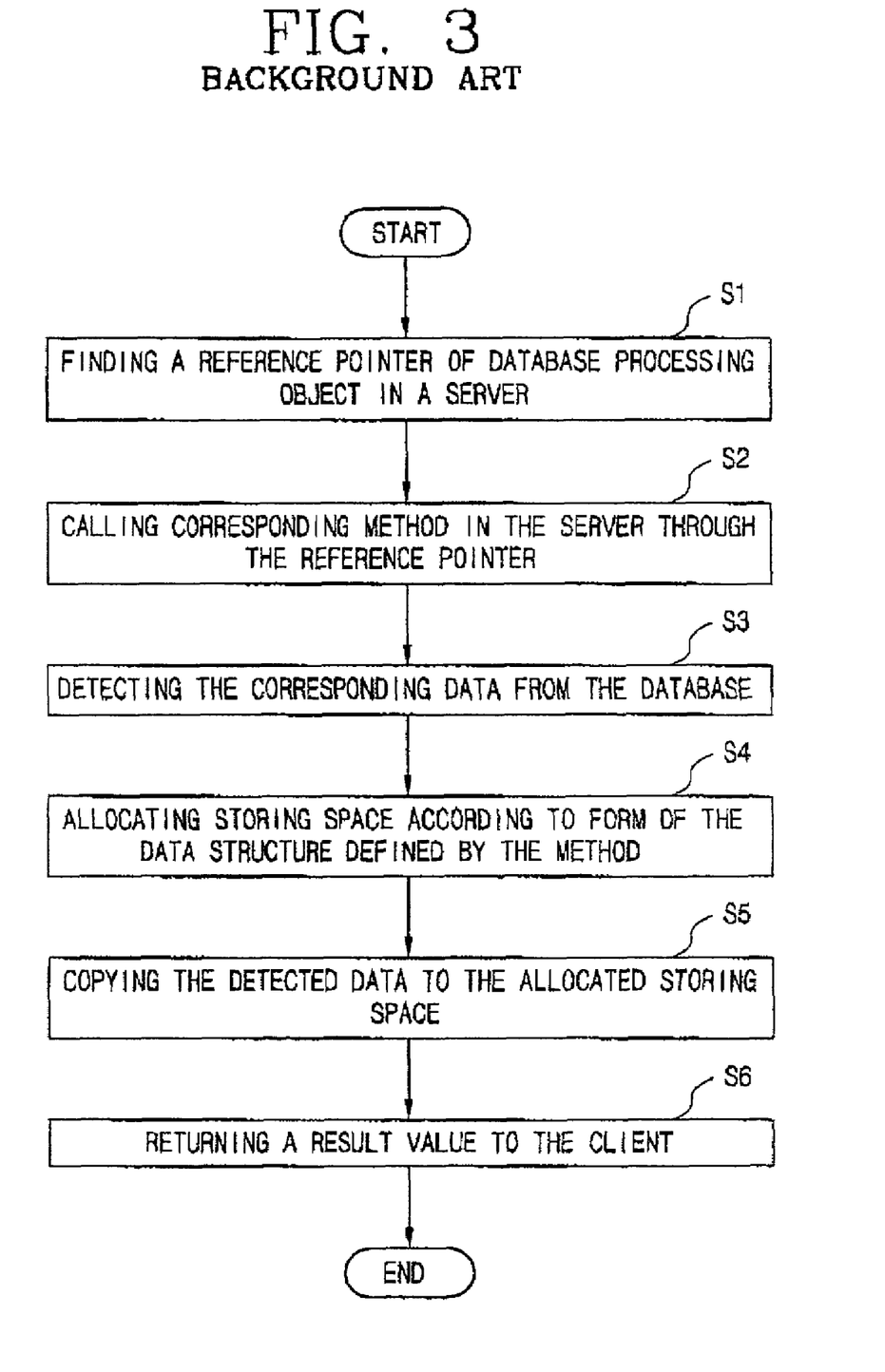
FIG. 3 illustrates a flow chart showing the background art method for database processing in the distributed processing system, based on the CORBA platform.

FIG. 3 is a flow chart showing a database processing method using the background art CORBA platform. As shown therein, the client 10 finds the reference pointer of the database processing object in the server 20 (S1) and calls the method of the server 20 through the reference pointer (S2).

The called method detects the data required by the client 10, in database 30, through a search condition of the SQL string. Also, the called method allocates the storing spaces, according to the data structure form defined by the client 10 (S3 and S4), and copies the detected data to the allocated storing space (S5). In addition, a result value calculated by the above processes (S3, S4, and S5) is transmitted to the client 10, through the ORB 40 (S6).

An embodiment for processing the database using the background art distributed processing system, based on the CORBA platform, will be described in more detail with reference to FIGS. 2 and 3. The client 10 finds a reference pointer of the database processing object, located in the server 20, to detect the wanted data, by accessing the database 30. After that, the client 10 calls the corresponding method using the SQL string and the data structure pointer as method calling parameters. The SQL string is a parameter related to the query of the client. The called method detects the corresponding data using the SQL string as a database searching condition. The server 20 allocates the storing space according to the data structure form defined by the called method and copies the detected data to the allocated storing space.

The result value calculated through the above processes is stored in a certain memory area of the server 20 and returned to the memory area of the client 10, pointed to by the data structure pointer, through ORB 40. For example, assume that items of "name", "customer number", "birthday", and "customer score" of customers having a customer score greater than 500 points are detected within the database by the client 10, among various information related to the customers stored and managed in database 30. Further assume that the detected data are "AAA", "1011", "May 27, 1977", "501", "BBB", "1120", "Nov. 20, 1972", "620", "CCC", "1313", "Oct. 28, 1974", and "550".

The method-A IDL call of client 10 is shown in Table 1, below.

TABLE 1

Step A
    Struct structA
    {
    string strA; /"name" item/
    short intA1; /"customer" item/
    date datA2; /"birthday" item/
    short intA3; /"customer score" item/
    };

TABLE 1-continued

```
Step B
    typedef sequence<structA> returndataA;
Step C
    short methodA(in string SQLstring, out returndataA retVal);
```

Step A defines the data structure that will be detected in database 30. Step B declares the data structure, defined in step A, as a sequence type. Step C is a sentence for calling a method having two parameters. As described above, if the data structure is declared as the sequence type, arrays having the same number of stored data are generated, so that memory is not wasted.

The client 10 creates the data structure reference pointer and the SQL string parameters and calls the corresponding method in the server 20 (Step C). The called method detects the corresponding data in the database 30 and allocates the storing space, in the form defined by the data structure. In addition, the method copies the detected data to the allocated storing space.

The result value, calculated through the above processes, is stored in a certain memory area of the server 20. After that, the result is returned to the memory area of the client 10, pointed to by the data structure pointer, through the ORB 40. In addition, the client 10 accesses the memory area in which the returned value is stored and outputs the corresponding data.

As described above, the server 20 should add a new method to the database processing objects, when no current method is able to accept the request of the client 10. In addition, when the new method is added, both the original methods and the new method should be compiled to redefine the IDL. As new methods are added, the corresponding objects get larger.

Also, in the process of designing the database program, the developer should consider all prospective client requests and should define a plurality of methods and data structures to support these client requests. Therefore, it takes a lot of time and expense to develop the program.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Therefore, an object of the present invention is to provide a method for processing a dynamic database in a distributed processing system, based on CORBA platform, that defines data structures, processed between a client and a server, and allocates memory for the structures automatically.

Another object of the present invention is to provide a method for processing a dynamic database in a distributed processing system, based on CORBA platform, by which requests of the client can be accepted using a method.

To achieve these and other advantages and in accordance with the purpose of the present invention, as embodied and broadly described herein, there is provided a method for processing a dynamic database in a distributed processing system, based on a CORBA platform, including calling a generic method of a server; detecting data using the called generic method; storing the detected data in a local memory; generating or expanding a storing space, according to the form and number of the detected data; copying the detected data in the local memory, in a storing space generated in a certain memory area of the server; and returning the detected data to a client.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 4:
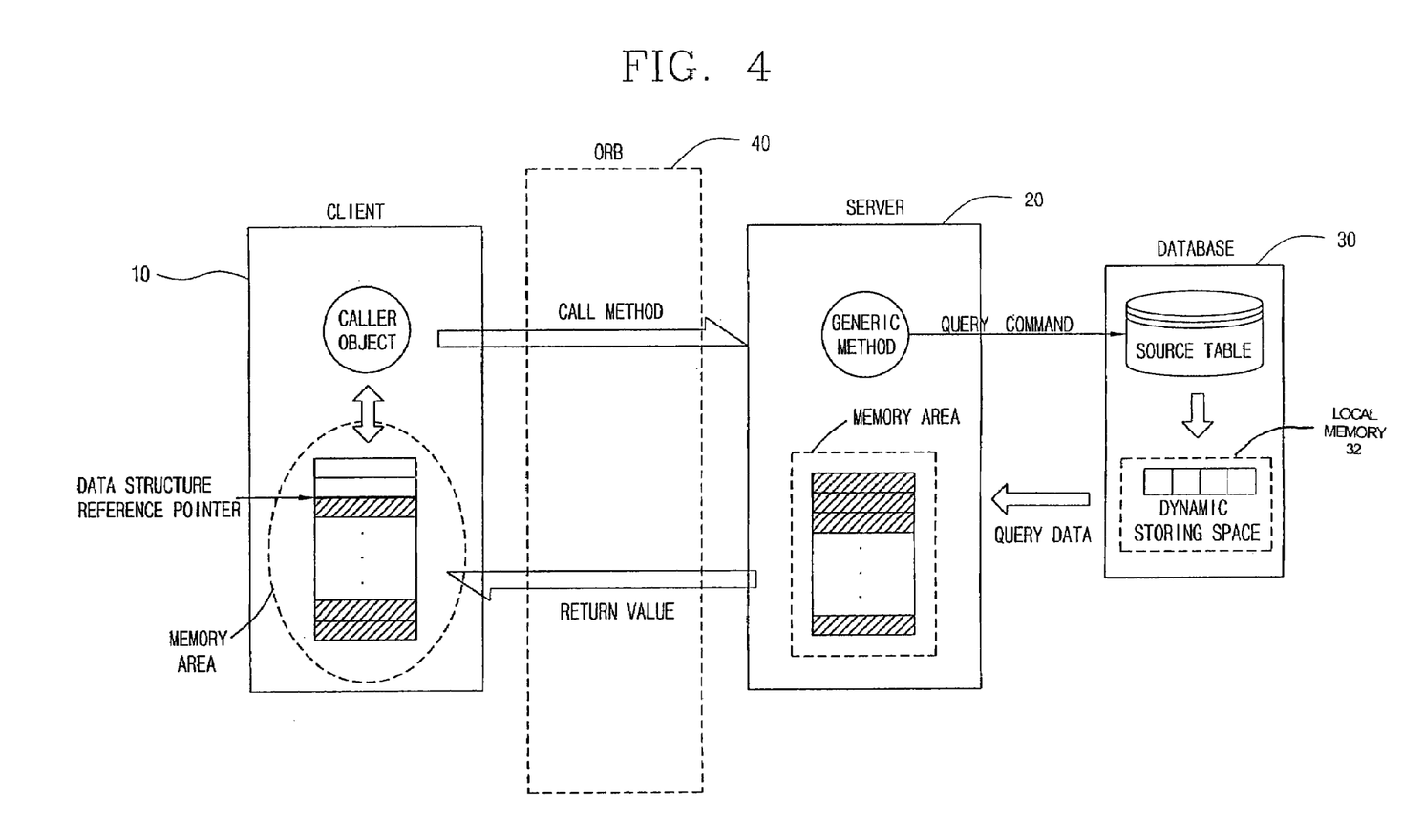
FIG. 4 illustrates a method for processing a dynamic database according to the present invention.

FIG. 4 is a block diagram showing a method for processing a dynamic database in a distributed processing system, based on a Common Object Request Broker Architecture (COBRA) platform, according to the present invention. A form of data detected in the database is declared as an Any type, and a structure of the data is declared as a sequence type. Various requests of clients can be accepted using a method. The Any type may take any one of numerous data forms, such as string, integer, float, decimal, and date, and is able to present all of the data forms used in the database 30. In addition, a memory space declared as the sequence type has basically the same structure as that of an array structure. However, it is different in that the memory space is generated automatically to have the same number of bits (i.e., size) as that of the data. If the storing space, which has been declared once, is declared as the sequence type again, the storing space is expanded as two-dimensional space and then expanded to n-dimensional space, if the space is declared as the sequence type n times.

The method for processing dynamic database in a distributed processing system based on a CORBA platform according to the present invention comprises: calling a generic method of a server 20; detecting data by the called generic method; storing the detected data in a local memory 32; generating or expanding a storing space according to form and number of the detected data; copying the detected data in the local memory in a storing space generated in a certain memory area of the server 20; and returning the detected data to a client 10.

Figure 6:
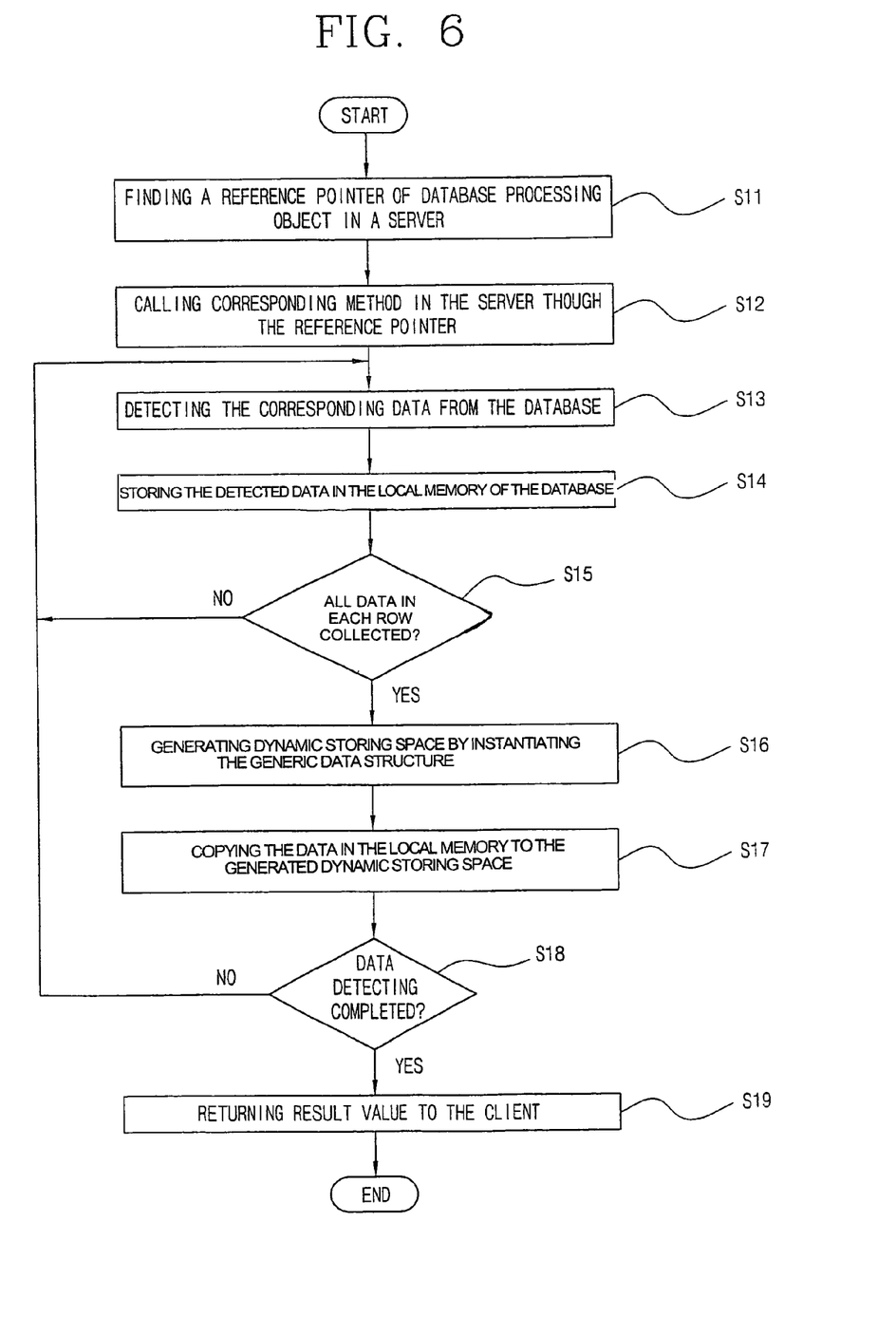
FIG. 6 illustrates a flow chart showing the method for processing the dynamic database in the distributed processing system, based on the CORBA platform, according to the present invention.

FIG. 6 is a flow chart showing the method for processing the dynamic database in the distributed processing system, based on the CORBA platform, according to the present invention. The operation of the present invention will be described, as follows, with reference to FIG. 6. The client 10 finds a reference pointer of a database processing object (S11) and calls the generic method in the server 20, using the SQL string and a pointer of the generic data structure as parameters (S12). In defining the data structure, the client 10 does not define the data type or structure, but defines a generic data structure using declarative functions of Any type and of sequence type, so that the memory area is automatically generated according to the structure or the number of the detected data.

The called generic method detects the corresponding data in the database 30, under the searching condition of the SQL string (S13). The detected data are stored in the local dynamic memory (S14). In addition, the generic method generates a storing space by instantiating the data structure. After that, the data stored in the local memory are copied to the generated storing space (S16 and S17).

The processes S13~S17 are repeatedly performed until all the data satisfying the SQL string (Query) are detected (S18). When the processes S13~S17 are completed, a result value in the storing space is returned to the client 10, in the same manner as in the background art (S19).

In process S15, the detected data are stored in the local memory in a linked-list form, regardless of the data table structure. To return the detected data to the client 10, the generic method allocates the storing spaces as the number of the data using the sequence type declarative function and declares the respective storing spaces as Any types. This is referred to as an instantiation process.

Processing procedures for process S11 and process S19 are the same as the processing method in the background art distributed processing system, based on the CORBA platform.

Figure 5:
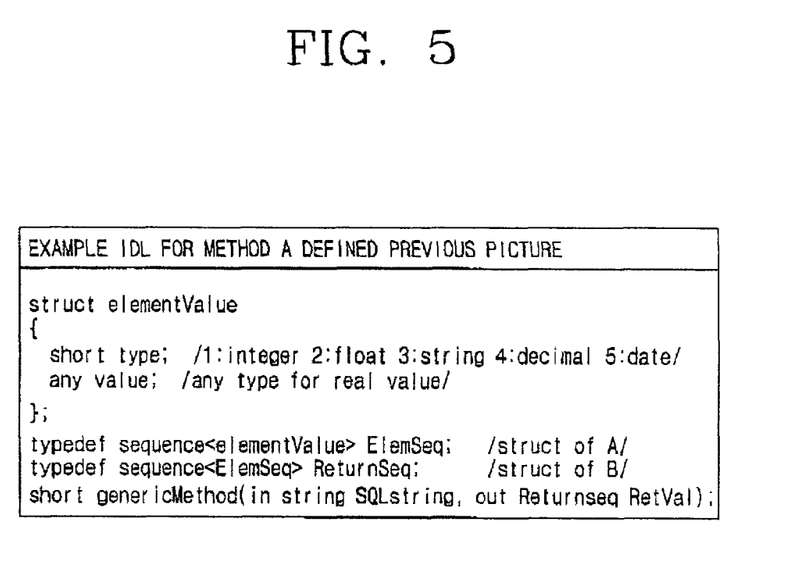
FIG. 5 illustrates an IDL for a preferred method of processing a dynamic database, according to the present invention.

FIG. 5 is a preferred embodiment of an Interface Definition Language (IDL) method according to the present invention. The method for processing a dynamic database in the distributed system, based on the CORBA platform, of the present invention will be described with reference to FIG. 5.

Assume the client 10 wants to detect items of "name", "customer number", "birthday", and "customer score" of the customers having customer scores greater than 500 points, among the various information related to the customers stored and managed in database 30. Further assume that the detected data are "AAA", "1101", "May 27, 1977", "501", "BBB", "1120", "Nov. 20, 1972 ", "620", "CCC", "1313", "Oct. 28, 1974", and "550".

A generic method calling IDL of the client 10 is provided in Table 2, below.

TABLE 2

Step AA
    Struct elementValue
    {
      short type; /1:integer 2:float 3:string 4:decimal 5:date/
      any value; /any type for real value/
    };
Step BB
    typedef sequence<elementValue> ElemSeq;
Step CC
    typedef sequence<ElemSeq> ReturnSeq;
Step DD
    short genericMethod(in string SQLstring, out ReturnSeq RetVal);

Step AA defines the generic data structure so that the detected data has the Any type data form. Step BB declares the data structure defined in step AA as the sequence type and generates an array of first structure. In addition, step CC declares the data structure defined in step BB as the sequence type again, and generates the array of a two dimensional structure. Step DD shows the calling for the generic method.

To begin with, the client 10 calls the generic method by setting the "pointer of the generic data structure" and the "SQL string" as parameters, which are respectively defined as Any type and sequence type. The called generic method applies the SQL string through a dynamic SQL mode, supported by database 30. Then, the corresponding data is detected and stored in the local memory in a linked-list form.

The first row data is all detected and the generic method instantiates the data structure in a certain memory area of the server 20, whereby a storing space for copying the row data is generated (Step BB). The storing space generated by the instantiation is comprised of four arrays declared as Any types, and the four elements of detected data ("AAA", "1011", "May 27, 1977", and "501") comprising the first row will be stored in the four respective arrays, as shown by Table 3.

TABLE 3

| | Array 1 | Array 2 | Array 3 | Array 4 |
|---|---|---|---|---|
| Type Declaration | Any type | Any type | Any type | Any type |
| Stored Value | AAA | 1011 | Jun. 27, 1977 | 501 |

When the generic method detects all of the data satisfying the SQL string (Query), that is, when the second row data ("BBB", "1120", "Nov. 20, 1972", "620") and the third row data ("CCC", "1313", "Oct. 28, 1974", and "550") are detected, the one-dimensional array is declared once again as the sequence type (Step CC) and the two-dimensional storing space is generated as shown by Table 4.

TABLE 4

| | Array 1 | Array 2 | Array 3 | Array 4 |
|---|---|---|---|---|
| First Row Data | Any Type | Any Type | Any Type | Any Type |
| First Row Data | Any Type | Any Type | Any Type | Any Type |
| First Row Data | Any Type | Any Type | Any Type | Any Type |

Of course, the detected respective data are stored in the local memory and then copied to the memory area as a row-data unit. In addition, whenever the row data are copied to the memory area, four storing-areas (arrays), which are declared as Any type, are expanded to store the data.

The storing areas (3*14 arrays) generated in the memory area store the data, as shown by Table 5.

TABLE 5

| First Row Data | AAA | 1011 | May 27, 1977 | 501 |
|---|---|---|---|---|
| Second Row Data | BBB | 1120 | Nov. 20, 1972 | 620 |
| Third Row Data | CCC | 1313 | Oct. 28, 1974 | 550 |

As described above, the data structure defined by the generic method is generated and expanded dynamically by the Any type and the sequence type. That is, the data structure of the generic method is not defined to have a fixed form, before calling the method, but is flexibly generated according to the form and the number of the detected data, after searching the database 30.

When all of the corresponding data are detected, the detected result value is stored in the memory area of the client 10, pointed to by the pointer of the data structure, through the ORB. The client 10 accesses the memory area, in which the result value is stored, and outputs the corresponding data.

As described above, according to the present invention, the method IDL is defined generically, and the defined method automatically generates and expands the memory area in which the detected data is stored. Thereby, a range of program designing is minimized. Therefore, the developer of the program is able to reduce the time and expense spent defining the IDL of the plurality of methods and defining the data structure.

Also, for a transaction request of the client that is not defined, the background art defines new IDLs and must then compile them. However, according to the present invention, various transaction requests of the client can be accepted using the generic method and the generic data structure, which are defined when the database program is developed.

Also, according to the present invention, the problem of dynamic binding of the data (i.e., a form or a structure of the data cannot be known until the data is detected) generated while processing the SELECT query, of the background art database, can be solved. Thereby, processing for various distributed transactions, based on the CORBA platform, and the function of the processor can be increased, accordingly.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for processing a dynamic database in a distributed processing system based on a Common Object Request Broker Architecture (CORBA) platform, comprising:
    calling a generic method in a server, the call containing a generic undefined data structure from a requesting client;
    detecting data by the called generic method and storing the data; and
    returning the detected data to the client in the distributed processing system, the data being constructed according to a form and a number of the detected data,
    wherein the generic method is capable of processing all calls from a requesting client including calls related to a service request that is not defined.

2. The method of claim 1, wherein storing the detected data comprises:
    storing the detected data in a local memory at the dynamic database;
    generating and expanding storing space in a memory area of the server, according to the form and the number of the detected data; and
    copying the detected data from the local memory to the storing space.

3. The method of claim 2, wherein the generation and expansion of the storing space are accomplished through a sequence type declarative function.

4. The method of claim 2, wherein a data form of the generated storing space is declared as any type.

5. The method of claim 2, wherein the copying of the detected data is performed on data units of rows.

6. The method of claim 2, wherein the storing space is automatically generated by any type and sequence type declaratives within the generic undefined data structure used to call the generic method.

7. The method of claim 1, wherein the server contains only one method, the one method being the generic method.

8. The method of claim 1, wherein the generic method is called by the generic undefined data structure comprising a Structure Query Language (SQL) string parameter and a pointer parameter.

9. The method of claim 8, wherein the generic undefined data structure is defined by declarative functions of any type and sequence type.

10. A method for processing a dynamic database in a distributed processing system, based on a Common Object Request Broker Architecture (CORBA) platform, comprising:
    calling a generic method in a server, the call containing a generic undefined data structure from a requesting client;
    detecting data by the called generic method;
    storing the detected data in a local memory of the dynamic database;
    generating and expanding a storing space in a memory area of the server, according to a form and a number of the detected data;
    copying the detected data from the local memory to the storing space; and
    returning the detected data to a client, in the distributed processing system, the data being constructed according to the form and the number of the detected data,
    wherein the generic method is capable of processing all calls from a requesting client including calls related to a service request that is not defined.

11. The method of claim 10, wherein the generic undefined data structure used to call the generic method has a data form declared as any type.

12. The method of claim 10, wherein the generic method generates and expands the storing space using a sequence type declarative function.

13. The method of claim 10, wherein the detected data stored in the local memory is copied to the storing space by units of row data.

14. The method of claim 10, wherein the server accepts all data processing requests from the client using only one method, the one method being the generic method.

15. The method of claim 10, wherein the storing space of the memory area is automatically generated by an any type declarative function and by a sequence type declarative function.

16. A distributed processing system based on a Common Object Request Broker Architecture (CORBA) platform for processing a dynamic database, comprising:
    a dynamic database, the dynamic database including a local memory;
    a client device, the client device generating a service request calling a generic method, the call containing a generic undefined data structure; and a server device, the server device containing the generic method, the generic method processing the call and detecting data in the dynamic database, the server device performing:
  generating and expanding a storing space in a memory area of the server according to a form and a number of the detected data;
  copying the detected data from the local memory to the storing space; and
  returning the detected data to the client device, the returned data being constructed according to a form and a number of the detected data,
wherein the generic method is capable of processing all calls from the client device including calls related to a service request that is not defined.

17. The system according to claim 16, wherein the generic undefined data structure used to call the generic method has a data form declared as any type.

18. The system according to claim 16, wherein the generic method generates and expands the storing space using a sequence type declarative function.

19. The system according to claim 16, wherein the detected data stored in the local memory is copied to the storing space by units of row data.

20. The system according to claim 16, wherein the server device accepts all data processing requests from the client device using only one method, the one method being the generic method.

* * * * *